O. L. RIEGELS.
EXPLOSION ENGINE OPERATED BY LIQUID FUEL.
APPLICATION FILED FEB. 16, 1909.
1,008,199.
Patented Nov. 7, 1911.
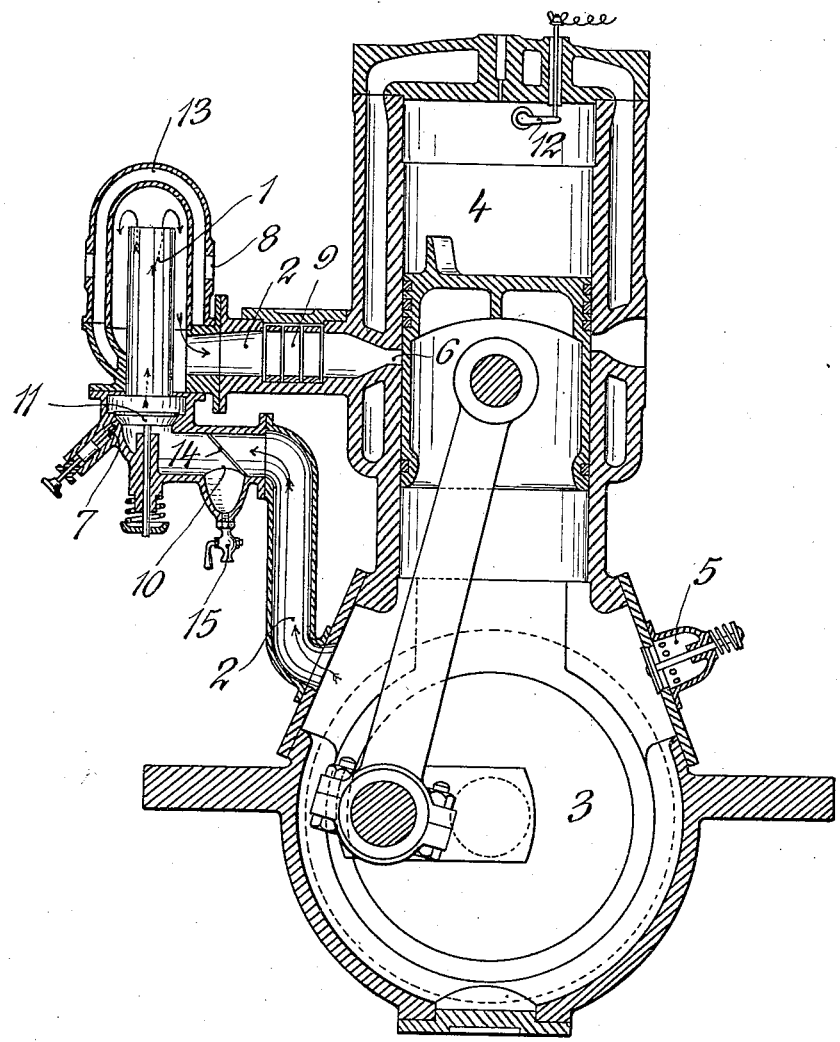
Witnesses;
INVENTOR,
OLOF LEONHARDT RIEGELS,
by
Attorney

UNITED STATES PATENT OFFICE.

OLAF LEONHARDT RIEGELS, OF CHRISTIANIA, NORWAY.

EXPLOSION-ENGINE OPERATED BY LIQUID FUEL.

1,008,199.   Specification of Letters Patent.   Patented Nov. 7, 1911.

Application filed February 16, 1909. Serial No. 478,195.

*To all whom it may concern:*

Be it known that I, OLAF LEONHARDT RIEGELS, of Christiania, in the Kingdom of Norway, have invented a new and useful Explosion-Engine Operated by Liquid Fuel; and I do hereby declare the following to be a full, clear, and exact description of the same.

My present invention relates to the two-stroke cycle explosion-engines, which are operated by means of heavy liquid fuels, for instance petroleum.

The invention substantially consists in the evaporator being arranged in the pipe or channel which connects the crank chamber to the engine cylinder. The combined atomizer, evaporator and carbureter which above and below is termed "evaporator" is preferably heated by the gases of combustion exhausted from the said cylinder. Hereby is obtained, that the fuel—which in two-stroke cycle engines operated by heavy hydrocarbons is usually sprayed into the cylinder in an atomized state—is converted into vapor and mixed with the air already before it passes into the cylinder, the consequence of which is a more complete combustion and a better economy than hitherto has been possible.

The invention is illustrated in the accompanying drawing which represents a vertical section through the engine.

The evaporator —1— is inserted in the pipe —2— or other channel connecting the closed crank chamber —3— with the combustion chamber —4— of the engine cylinder. Atmospheric air is sucked into the crank chamber 3, through the air-valve —5— during the upward stroke of the piston, whereupon the air during the down-stroke of the piston is pressed through the lower part of the pipe —2— up into the evaporator —1—, within which it is mixed with the fuel. The latter is supplied through the needle valve and is at once converted into a vaporous state. The explosive mixture hereby formed then—partly also under sucking action from the cylinder—passes through the upper part of the pipe —2— and enters through the port —6— the combustion chamber —4— of the cylinder, in which the mixture is compressed during the up-stroke of the piston and is ignited near the uppermost position of the latter by means of an electric arc produced by the igniting device —12—. The power developed by the explosion is then transmitted in usual way.

The evaporator is constructed in well-known manner. For instance the Dürr evaporator shown in the drawing may be used. In this evaporator the fuel is carried along and mixed with the air current passing with a high velocity through the mixing valve —11—. The conversion of the finely distributed fuel particles into a vaporous state and their intimate mixing with the air is effectively supported by the mixture coming in contact with surfaces or pipes which are highly heated by the hot gasses of combustion exhausted from the cylinder and conducted through a short pipe (not shown) and through the opening —8— into the jacket —13— of the evaporator.

The motor is started from being cold either by supplying to the cylinder through a threeway-valve a liquid fuel evaporating under normal atmospheric temperature (such as benzin) until the evaporator —1— has been sufficiently heated, or by previously heating the evaporator by means of a usual solder-lamp, in a well-known manner.

In order to obviate pre-explosions (back explosions) from attaining unto the evaporator, one or more frames —9— provided with metal gauze-cloth are inserted in the channel —2— between the evaporator and the cylinder. Also between the evaporator and the crank chamber the channel —2— is provided with an inclined gauze-cloth —14—, and beneath the latter is arranged a pit —10— provided with a tapping-cock —15— or a plug for the purpose of accumulating and removing waste of fuel and preventing same from coming down into the crank chamber —3—.

Having now described my invention, what I claim as new and desire to secure by Letters Patent is:—

1. In a cycle explosion engine, an engine cylinder, a casing secured to the engine cylinder and forming therewith a crank chamber, an inlet valve for the crank chamber, a piston in the cylinder and adapted to compress air in the crank chamber, a pipe connecting the cylinder and chamber with each other, an evaporator in said pipe, means for conducting the hot exhaust gases from the cylinder to the evaporator to heat the same, and a metal gauze inserted in said pipe between the evaporator and the crank chamber, said pipe being provided with a pit forming part of the channel between the metal gauze and the evaporator for collecting waste fuel from the evaporator.

2. In a cycle explosion engine, an engine cylinder, a casing joining the same and forming therewith a crank chamber, an inlet valve for the crank chamber, a piston in the cylinder and adapted to compress air in the crank chamber, a pipe connecting the crank chamber with the cylinder, an evaporator in said pipe, a frame with metal gauze inserted in the pipe between the evaporator and the cylinder and a mixing valve in the pipe between the evaporator and the crank chamber.

3. In a cycle explosion engine, an engine cylinder, a casing joining the same and forming therewith a crank chamber, an inlet valve for the crank chamber, a piston in the cylinder and adapted to compress air in the crank chamber a pipe connecting the crank chamber with the cylinder, an evaporator in said pipe, a metal gauze inserted in the pipe between the crank chamber and the evaporator, a frame with metal gauze inserted in the pipe between the evaporator and the cylinder and a mixing valve in the pipe between the first named metal gauze and the evaporator.

4. In a cycle explosion engine, an engine cylinder, a casing joining the same and forming therewith a crank chamber, an inlet valve for the crank chamber, a piston in the cylinder and adapted to compress air in the crank chamber a pipe connecting the crank chamber with the cylinder, an evaporator in said pipe, a metal gauze inserted in the pipe between the crank chamber and the evaporator, a frame with metal gauze inserted in the pipe between the evaporator and the cylinder and a mixing valve in the pipe between the first named metal gauze and the evaporator, said pipe being provided with a collecting pit between said first named metal gauze and the evaporator.

Signed at Christiania, Norway this twenty sixth day of January A. D. 1909.

OLAF LEONHARDT RIEGELS.

Witnesses:
RICHARD STOKKE,
AXEL LAHM.

---

Copies of this patent may be obtained for five cents each, by addressing the "Commissioner of Patents, Washington, D. C."